Oct. 2, 1945.   E. E. LAMBERT   2,385,868
CHAIN SAW TOOTH SETTING DEVICE
Filed June 13, 1944
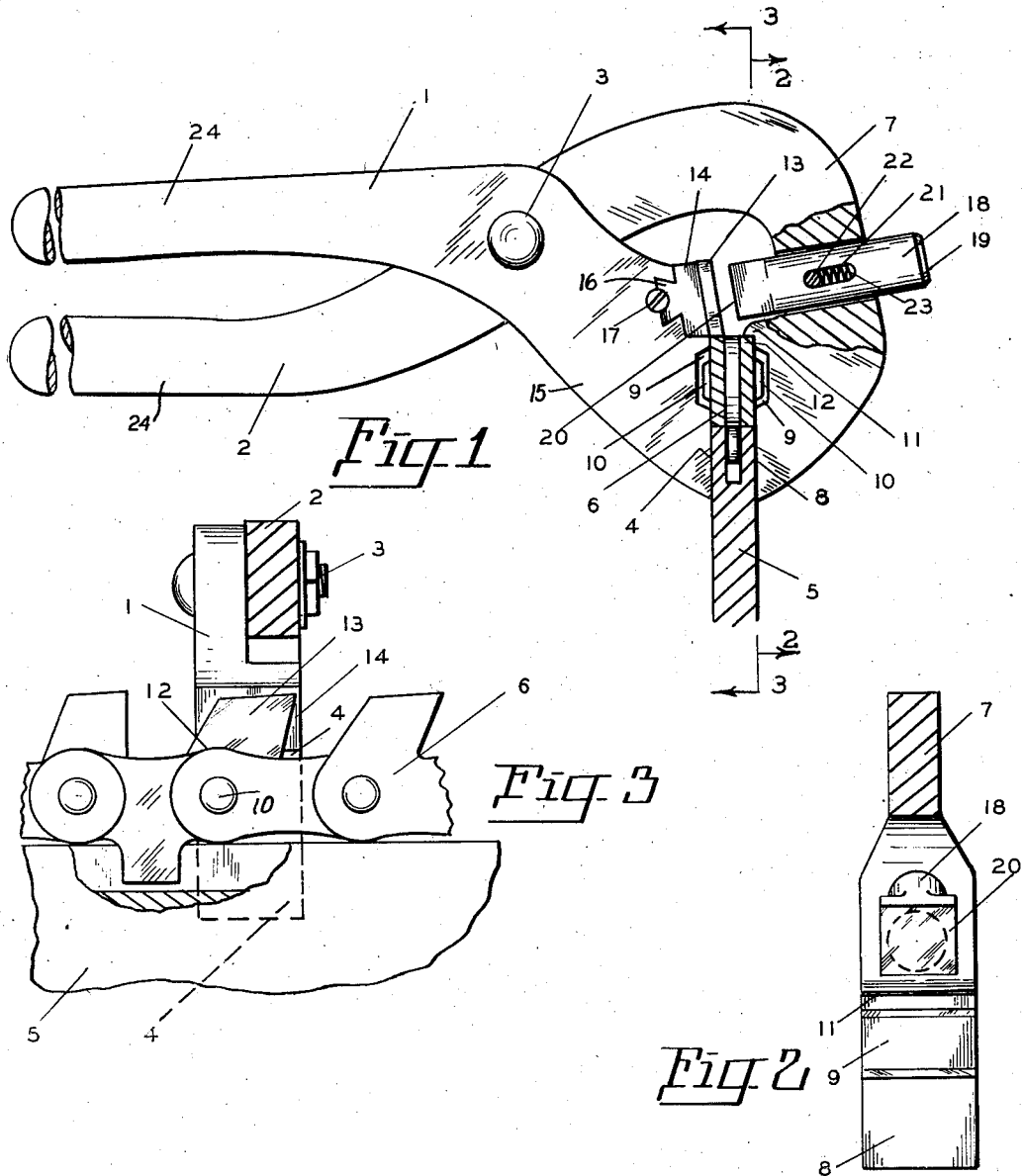
INVENTOR
ENOCH E. LAMBERT
BY
ATTORNEY Patented Oct. 2, 1945

2,385,868

UNITED STATES PATENT OFFICE 2,385,868

CHAIN SAW TOOTH SETTING DEVICE

Enoch E. Lambert, Otis, Oreg., assignor of one-half to Charles A. Ritz, Otis, Oreg.

Application June 13, 1944, Serial No. 540,052

1 Claim. (Cl. 76—70)

This invention relates to saw tooth setting devices and is particularly adapted for setting teeth on chain saws.

The primary object of the invention is to provide a portable tool for setting the teeth on chain saws that can be applied to the teeth of the saw without removing the saw chain from the saw bar, or it may be used on the chain while being supported on a filing rack.

A further object of the invention is to provide interchangeable dies within the device for governing the amount of set given to the tooth.

A further object of my invention is the provision of a portable saw setting device that will securely grip the chain saw holding it securely to the saw bar while the set is being made.

These and other incidental objects will be apparent in the drawing, specification and claim.

Referring to the drawing:

Figure 1 is a fragmentary side view of my new and improved tooth setting device being applied to chain saw, parts broken away for convenience of illustration.

Figure 2 is a fragmentary sectional view, taken on line 2—2 of Figure 1, looking in the direction indicated.

Figure 3 is a fragmentary sectional view, taken on line 3—3 of Figure 1, illustrating the relative position of the setting device to that of the chain saw and saw bar.

In the drawing:

My new and improved chain saw tooth setting device consists of two parts 1 and 2, hingedly connected together at 3, the whole assembly resembling a set of pliers. The body section 1 has a flat face 4 for engaging the side of the saw bar 5 and the side of the chain links 6, best illustrated in Figures 1 and 2. The body portion 2 extends beyond the pivot point 3 in the form of a goose neck 7, terminating in a flat face 8 for engaging the opposite side of the saw bar 5 and the chain 6. Both the faces 4 and 8 are cut away at 9 for straddling the ends of the pins 10 of the chain 6. The face 8 of the goose neck 7 has a shoulder 11 for engaging the upper edge of the link 12 for positioning the device accurately relative to the tooth 13 to be set. A removable die 14 is fixed to the jaw 15 by any suitable means, as for instance the dove tail connection 16 being locked in place by suitable locking means, as the locking screw 17.

The object of a removable and interchangeable die 14 is to accommodate the different tooth setting requirements relative to the amount of set given to the tooth. When the jaw 15 and the goose neck 7 are tightened against the saw bar 5 and the chain 6 they are guided into position by the shoulder 11. The plunger punch 18 is then struck on the end 19 by any suitable hammer, which will force its end 20 against the tooth 13, forcing the tooth against the anvil 14, shaping the same to correspond to the anvil and the end of the plunger punch. The plunger punch 18 returns to the retracted position as illustrated in Figure 2 by suitable spring 21 bearing against the retaining key 22 at its one end and against the end of the slot 23 at its opposite end.

In the operation of my new and improved chain saw setting device the jaw 15 and the goose neck 7 are opened and the device is placed over the chain, the shoulder 11 of the goose neck first contacting the upper surface 12 of the plain tooth opposite the tooth to be set, guiding the set to its proper location. The handles 24 are then brought together by the operator clamping the saw bar 5 and the chain 6 securely between the jaw 15 and the goose neck 7 holding the whole assembly rigidly while the plunger punch 18 is struck with the hammer shaping the tooth.

This device is portable, economical to manufacture and simple of operation, at the same time providing a precision tooth setting tool.

I do not wish to be limited to the exact mechanical construction as illustrated, as other forms of mechanical embodiment may be employed still coming within the scope of my claim.

What is claimed as new is:

A saw tooth setting assembly for chain saws, including a bar formed at one end with a slot for movably guiding the saw in combination with a tooth-setting tool comprising pivotally connected members formed at one end to provide jaws having relatively flat faces to engage the outer surfaces of the walls of the slot in the bar to bind the saw in fixed relation to the bar, means on one jaw to engage a saw in the bar slot to determine the vertical position of the jaws relative to the bar and included saw, an anvil carried by one jaw immediately above but wholly free of the flat face, and a spring-pressed plunger mounted in the other jaw for manual operation toward and for relative cooperation with the anvil for setting the saw tooth, the length of the slot in the bar providing upper end surfaces on which the saw is guided for successive tooth setting operations of the tool.

ENOCH E. LAMBERT.